United States Patent
Ichida et al.

(10) Patent No.: US 7,520,035 B2
(45) Date of Patent: Apr. 21, 2009

(54) SEATBELT APPARATUS

(75) Inventors: Yoshiyuki Ichida, Tokyo (JP); Tadayuki Asako, Tokyo (JP); Masahiko Nagahama, Tokyo (JP)

(73) Assignee: Takata Corporation, Tokyo (JP)

( * ) Notice: Subject to any disclaimer, the term of this patent is extended or adjusted under 35 U.S.C. 154(b) by 222 days.

(21) Appl. No.: 11/499,762

(22) Filed: Aug. 7, 2006

(65) Prior Publication Data

US 2007/0039144 A1 Feb. 22, 2007

(30) Foreign Application Priority Data

Aug. 19, 2005 (JP) ............... 2005-238477
Jun. 16, 2006 (JP) ............... 2006-167135

(51) Int. Cl.
*A44B 11/25* (2006.01)

(52) U.S. Cl. ...................... 24/633; 24/593.1

(58) Field of Classification Search ............. None
See application file for complete search history.

(56) References Cited

U.S. PATENT DOCUMENTS

| 3,795,030 | A |   | 3/1974 | Yates et al. |          |
|-----------|---|---|--------|--------------|----------|
| 4,903,377 | A |   | 2/1990 | Doty         |          |
| 5,561,891 | A | * | 10/1996| Hsieh        | 24/581.1 |
| 5,987,716 | A |   | 11/1999| Arai         |          |
| 2005/0115031 | A1 |   | 6/2005 | Tanaka    |          |

FOREIGN PATENT DOCUMENTS

| DE | 201 13 868 U1 | 2/2002 |
| EP | 1 654 948 B1 | 5/2006 |
| EP | 1 747 954 A1 | 1/2007 |
| JP | 2-111308 | 9/1990 |
| JP | 10-287247 | 10/1998 |
| JP | 2001-138862 A | 5/2001 |
| JP | 2001-315615 A | 11/2001 |
| JP | 2003-118538 A | 4/2003 |
| JP | 2004-224169 A | 8/2004 |

\* cited by examiner

*Primary Examiner*—Jack W. Lavinder
(74) *Attorney, Agent, or Firm*—Foley & Lardner LLP

(57) ABSTRACT

A seatbelt apparatus that is capable of improving seatbelt wearing operability may comprise a webbing, a tongue plate moveably attached to the webbing, which are provided with a grip portion to be gripped by an occupant and an engagement portion extending from the grip portion, and a buckle that receives and releases the engagement portion of the tongue plate for engagement and disengagement. A leather cover is applied to a front surface (corresponding to the palm of the occupant's hand for gripping) of the grip portion of the tongue plate.

17 Claims, 14 Drawing Sheets

[FIG. 1]
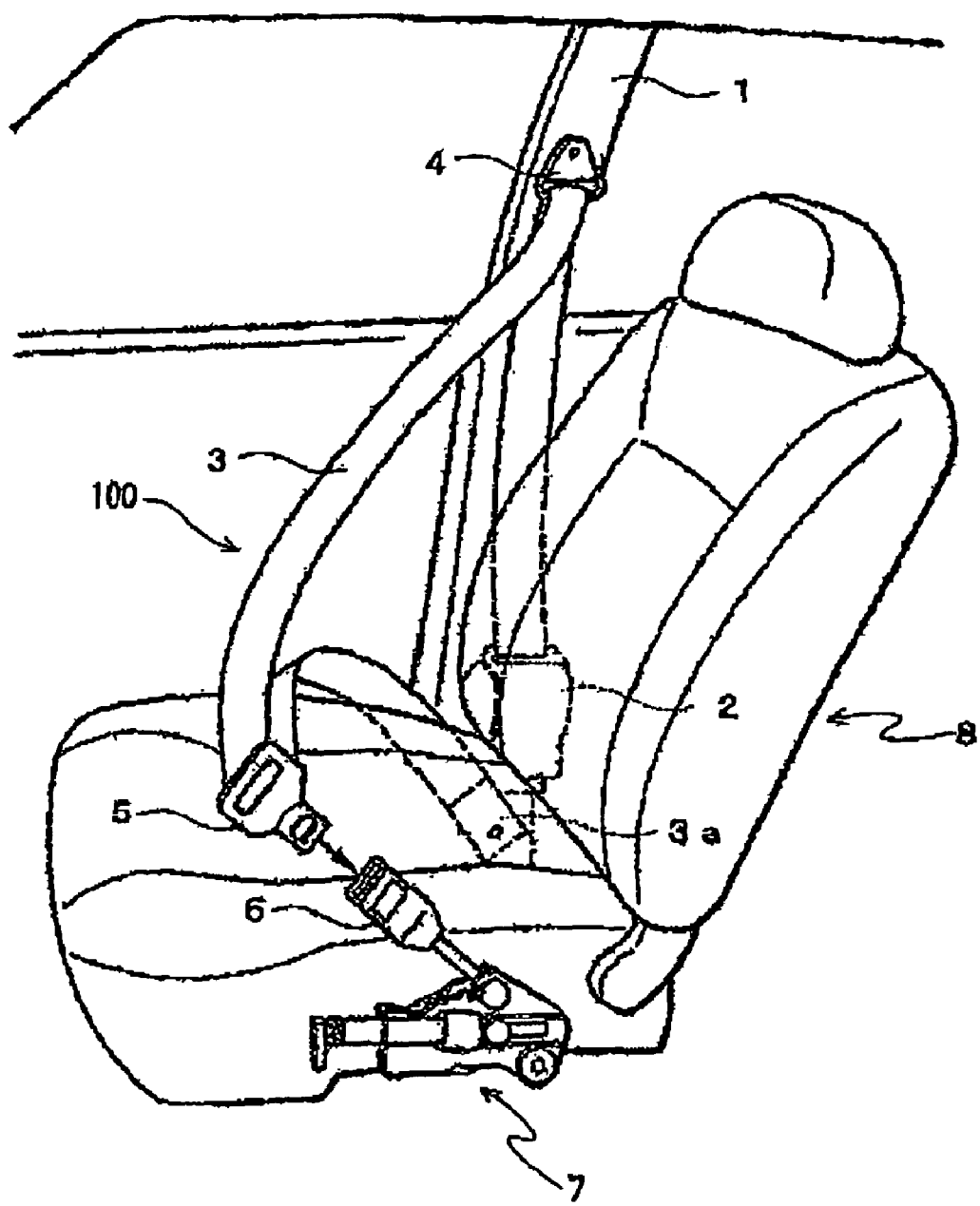

[FIG. 2]
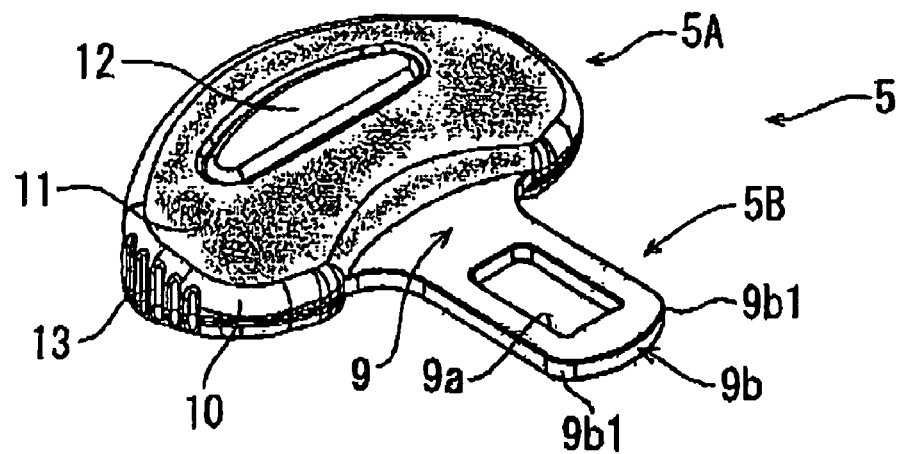
[FIG. 3]
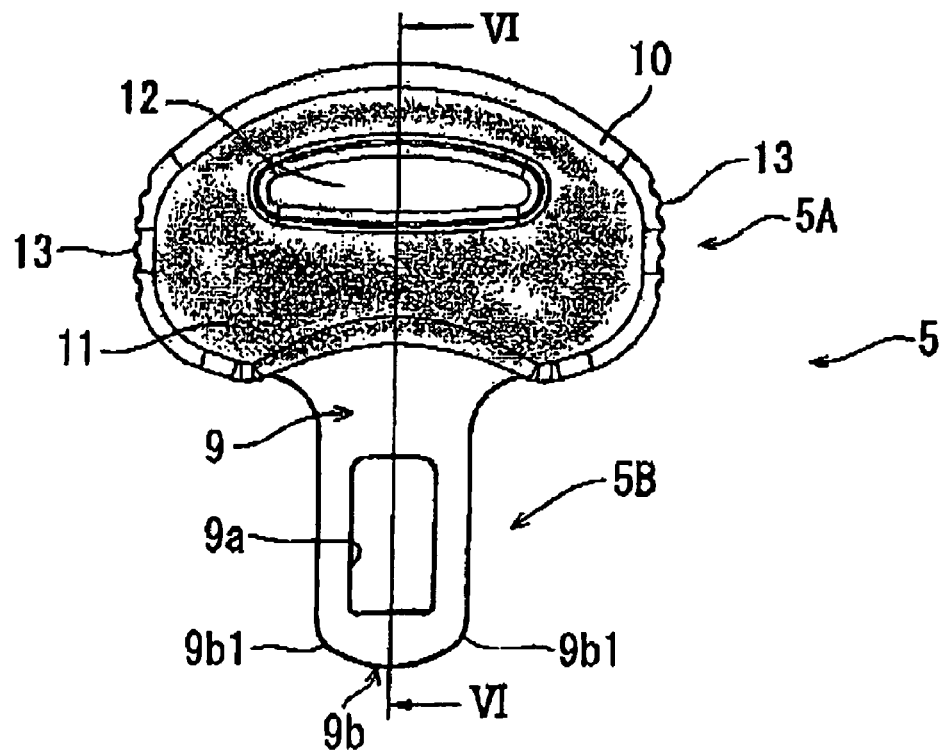

[FIG. 4]
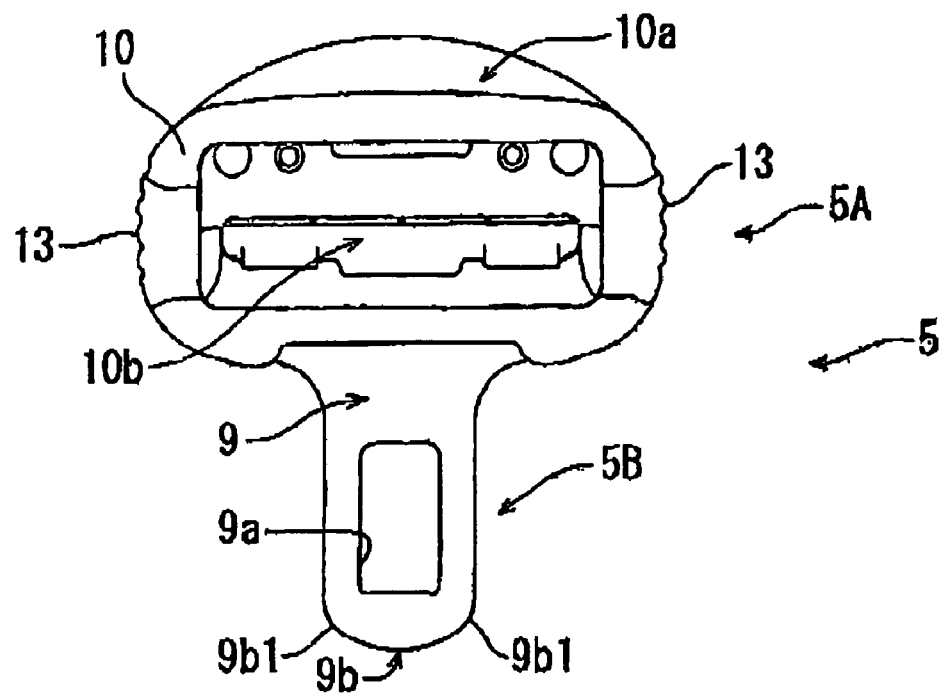
[FIG. 5]
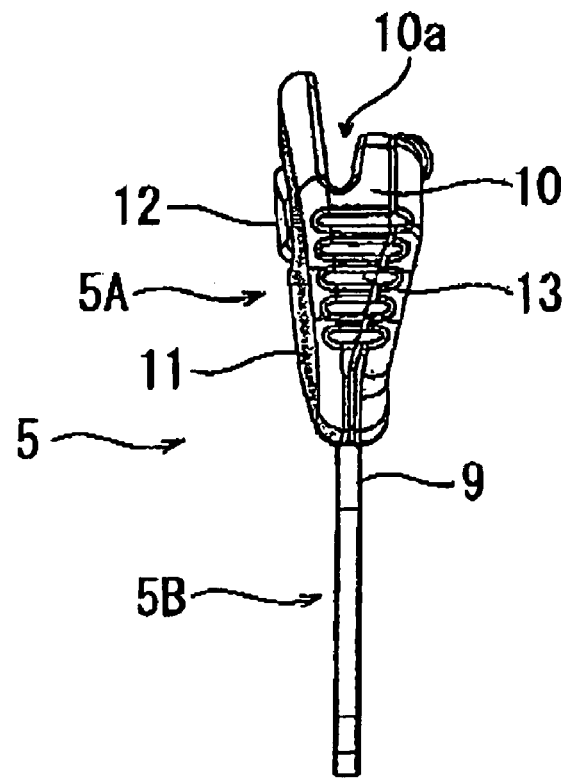

[FIG. 6]
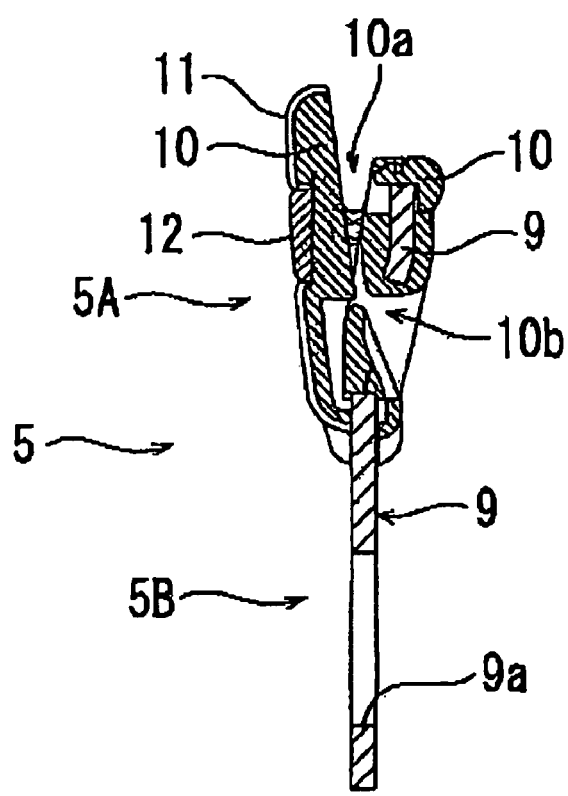
[FIG. 7]
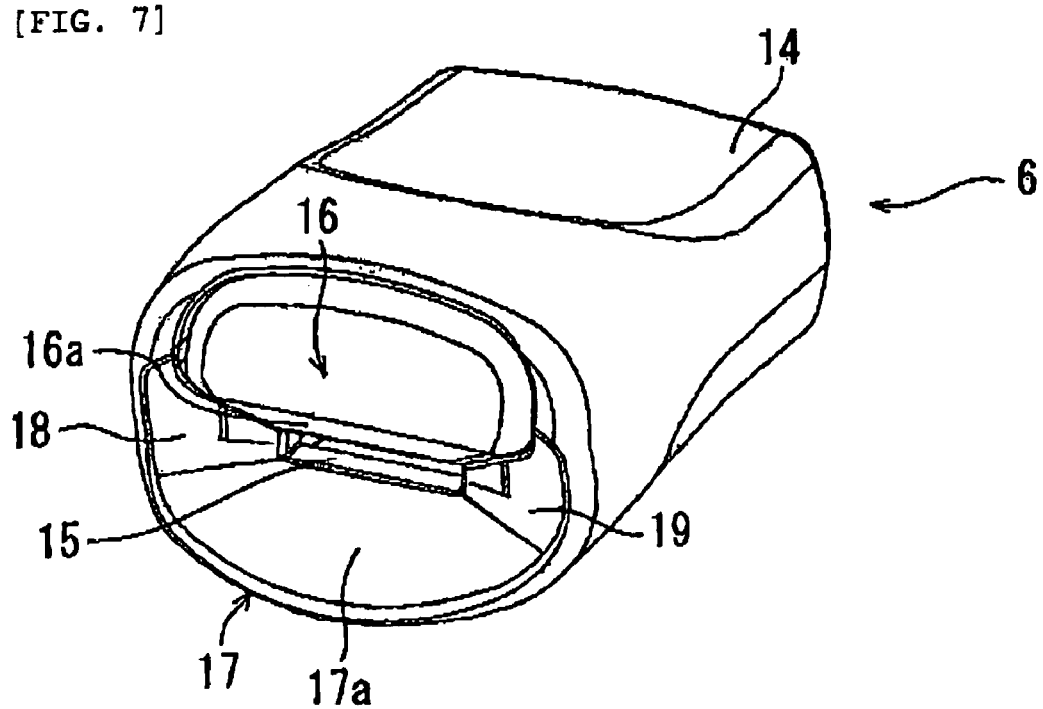

[FIG. 8]
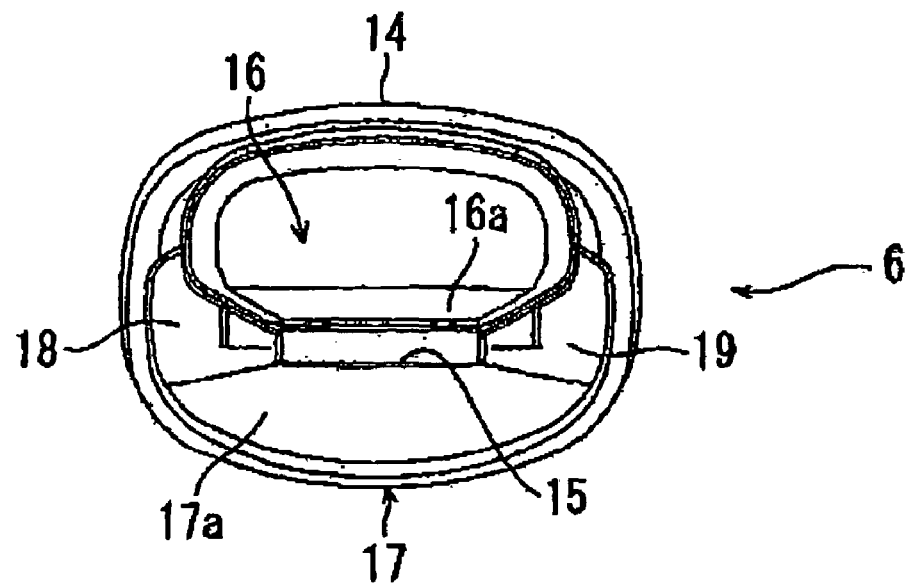
[FIG. 9]
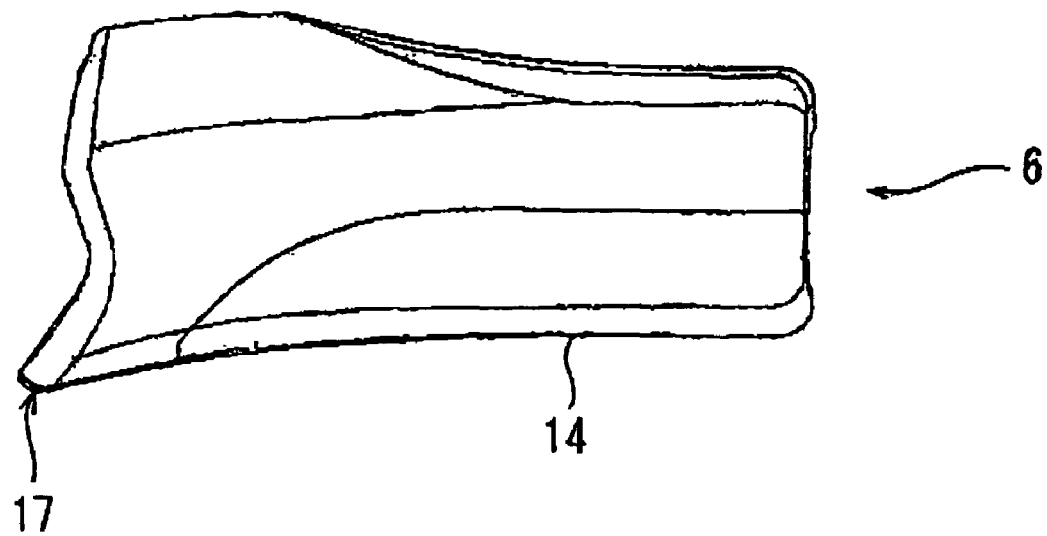

[FIG. 10]
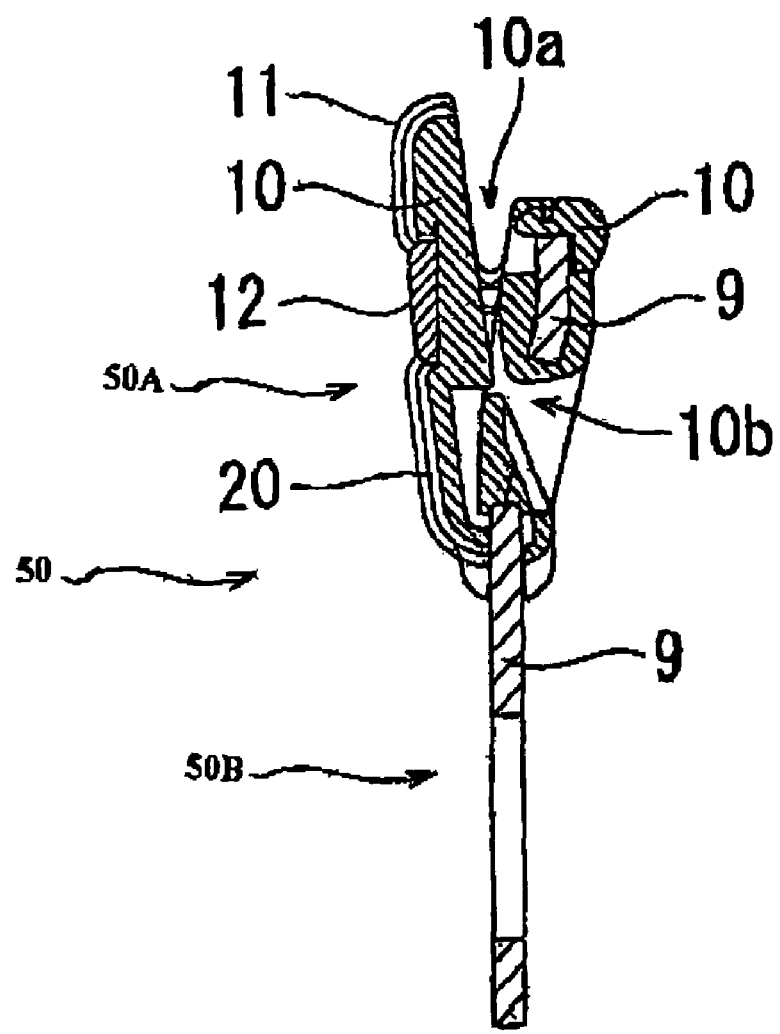

[FIG. 11]
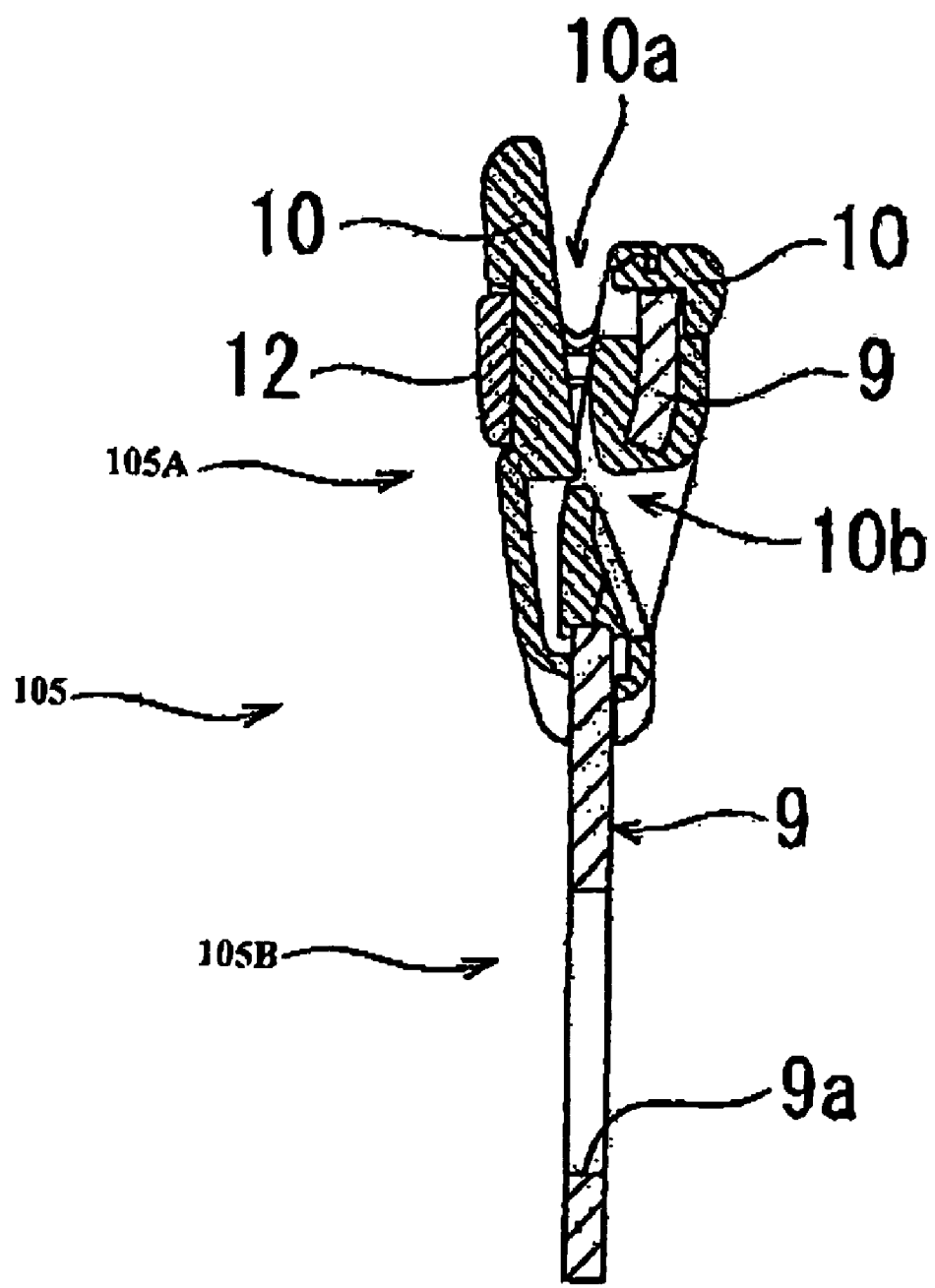

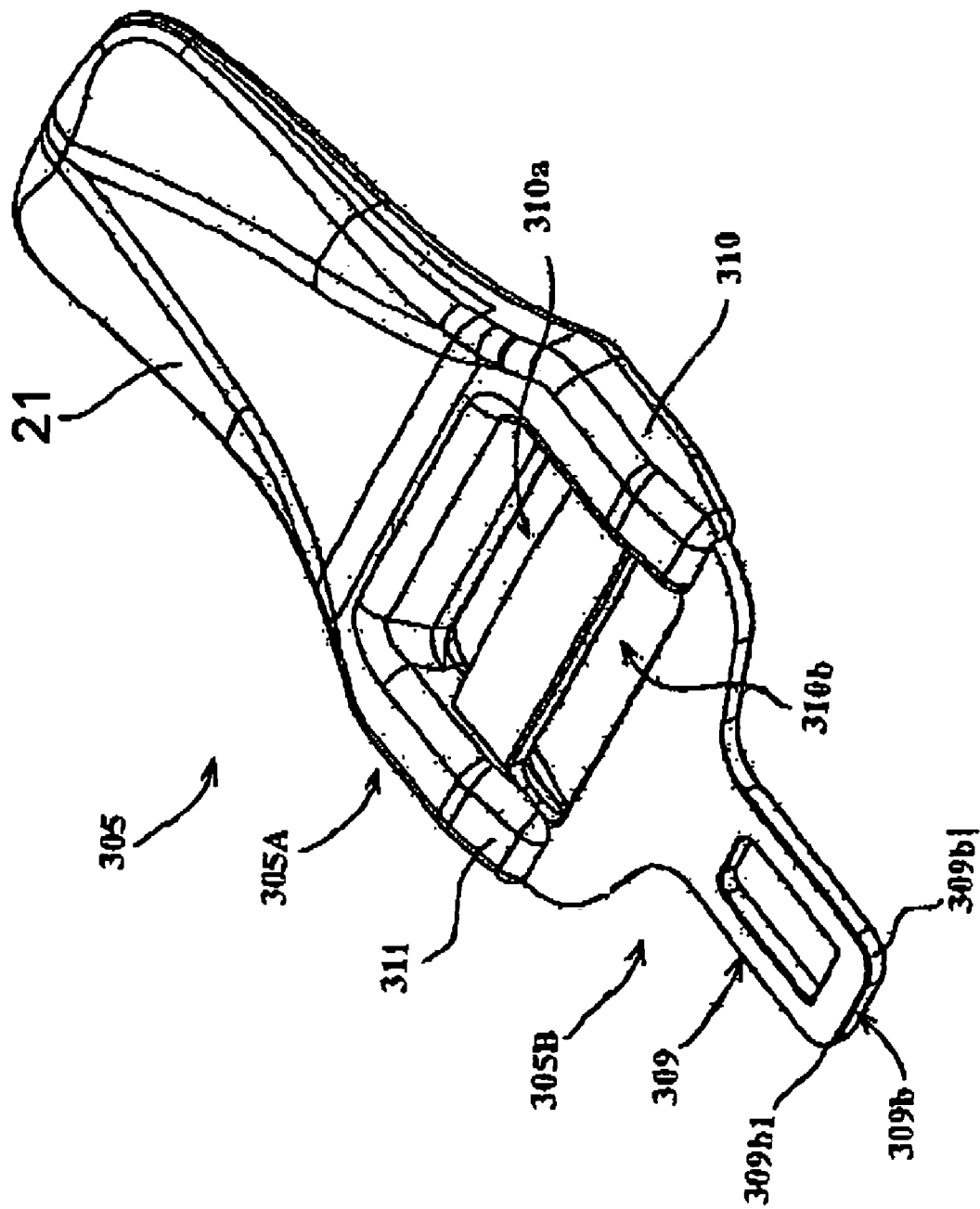

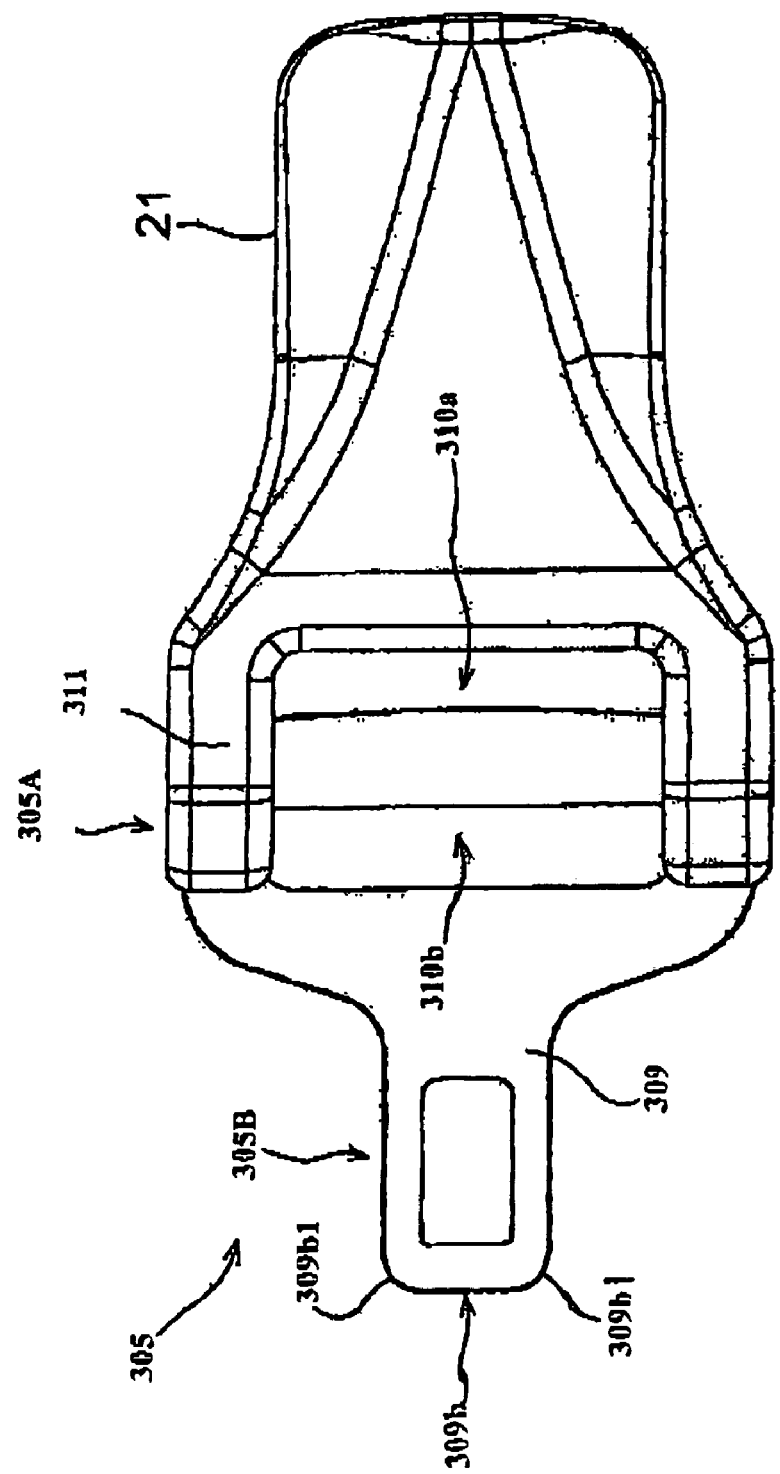

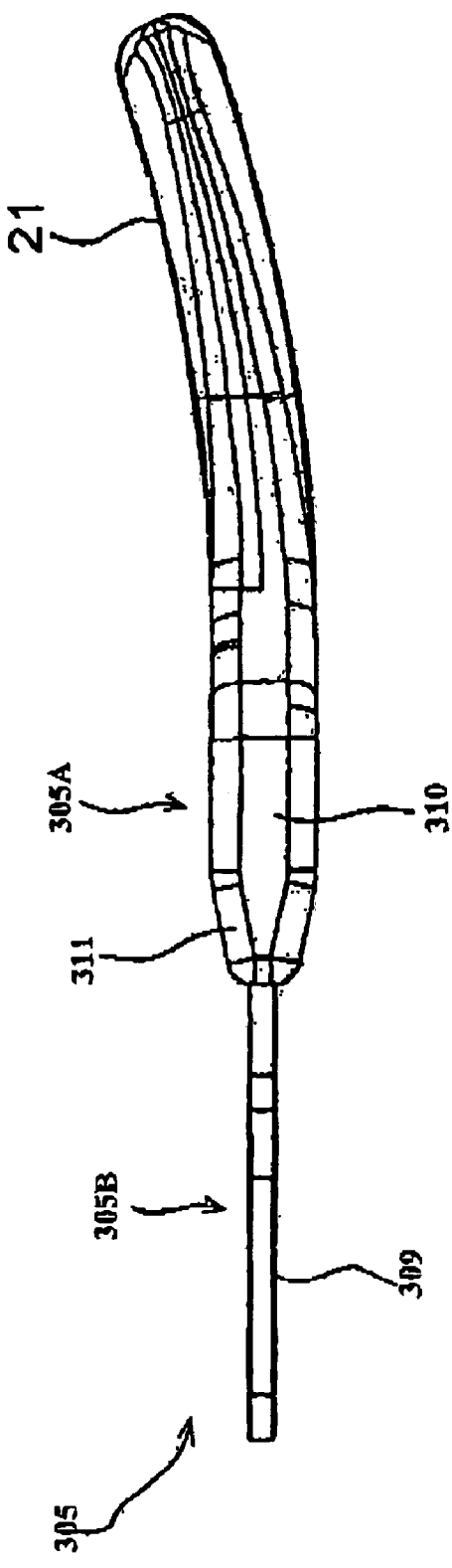
[FIG. 14]

[FIG. 15]
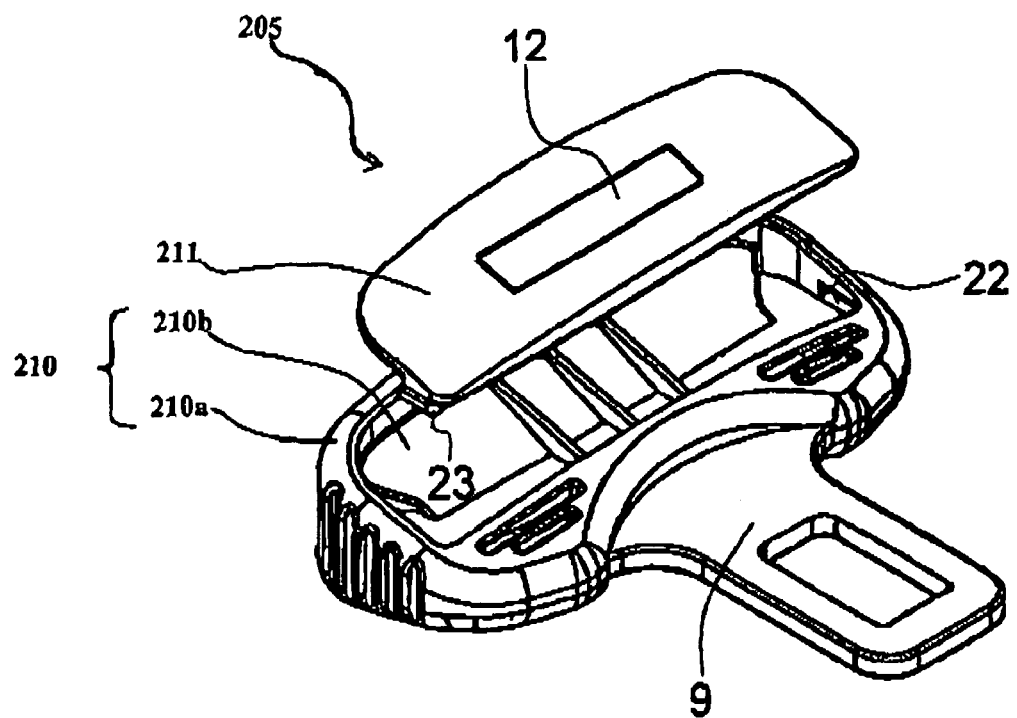

[FIG. 16]
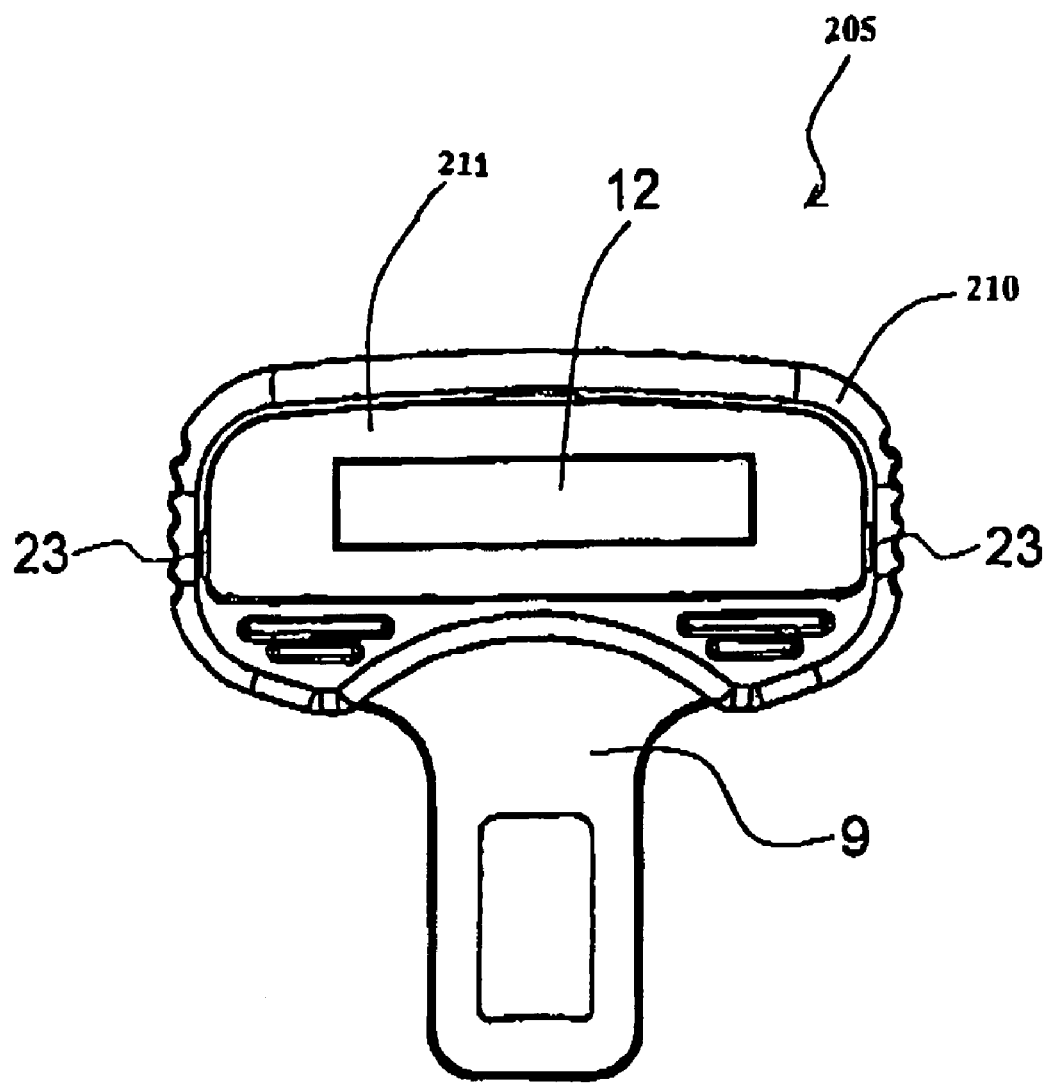

[FIG. 17]
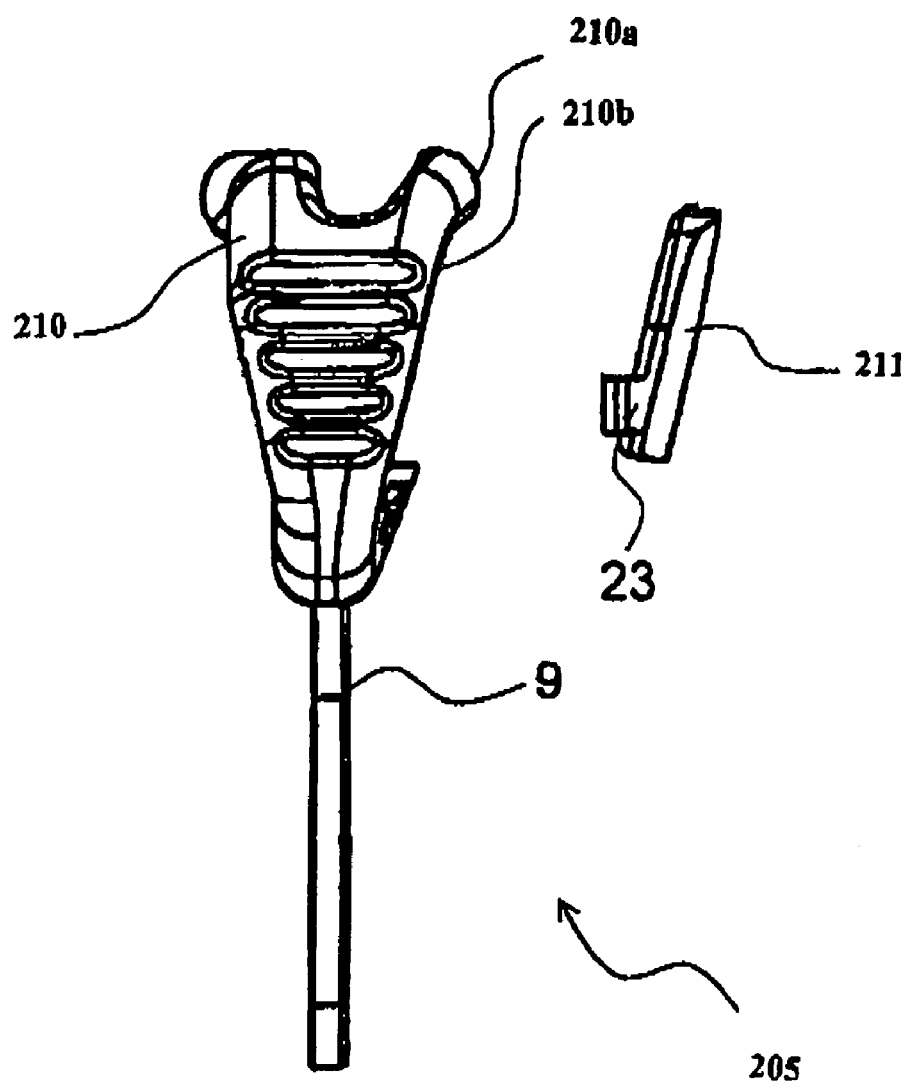

[FIG. 18]
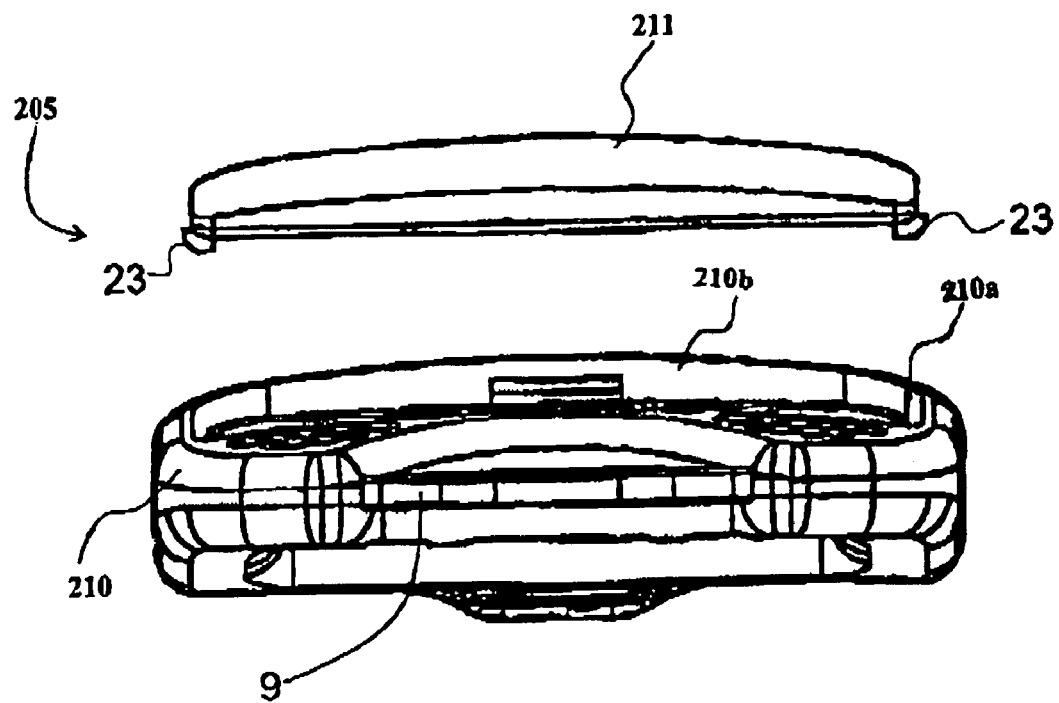

US 7,520,035 B2

SEATBELT APPARATUS

BACKGROUND

The present invention relates to a seatbelt apparatus equipped in a vehicle, such as an automobile for protecting an occupant therein.

A conventional seatbelt apparatus is generally formed of a webbing that restrains an occupant, a retractor that retracts one side of the webbing so as to be operated for retraction and withdrawal, a tongue plate attached to the webbing, and a buckle engaged with the tongue plate.

Conventionally, the tongue plate includes a grip portion (base portion for a plate operation) to be gripped by the occupant, and an engagement portion (tongue portion) that extends from the grip portion to be engaged with the buckle. The resin molded portion is applied to cover the surface of the grip portion, such as shown, for example, in Japanese Unexamined Patent Application Publication No. 2001-138862 (which is incorporated by reference herein in its entirety).

In the above-structured seatbelt apparatus the occupant withdraws the webbing from the retractor while gripping the grip portion of the tongue plate, and inserts the engagement portion into the buckle for wearing the seatbelt. The occupant on the seat is, thus, restrained.

SUMMARY

One embodiment of the invention relates to a seatbelt apparatus. The seatbelt apparatus comprises a webbing; a tongue plate attached to the webbing and provided with a grip portion to be gripped by an occupant and an engagement portion that extends from the grip portion; and a buckle that receives and releases the engagement portion of the tongue plate for engagement and disengagement. A cover is connected to a top surface of only one side of the grip portion of the tongue plate.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a perspective view of a portion around a seat representing an outline structure of a seatbelt apparatus according to an embodiment of the present invention.

FIG. 2 is a perspective view of an outline structure of a tongue plate according to an embodiment of the present invention.

FIG. 3 is a top view of an outline structure of the tongue plate according to an embodiment of the present invention.

FIG. 4 is a bottom view of the outline structure of the tongue plate according to the embodiment of the present invention.

FIG. 5 is a side view of the outline structure of the tongue plate according to the embodiment of the present invention.

FIG. 6 is a sectional side view of the outline structure of the tongue plate according to the embodiment of the present invention.

FIG. 7 is a perspective view of an outline structure of a buckle according to an embodiment of the present invention.

FIG. 8 is a front view of the buckle according to the embodiment of the present invention when seen from a slot portion.

FIG. 9 is a side view of the outline structure of the buckle according to the embodiment of the present invention.

FIG. 10 is a sectional side view of an outline structure of a tongue plate in a modified example in which a cushion material is applied inside the cover.

FIG. 11 is a sectional side elevation of an entire structure of a tongue plate of a modified example including a grip.

FIG. 12 is a perspective view of an outline structure of the tongue plate in the modified example in which a grip having a protruding configuration is provided.

FIG. 13 is a top view of the outline structure of the tongue plate in the modified example in which the grip having the protruding configuration is provided.

FIG. 14 is a side view of the outline structure of the tongue plate in the modified example in which the grip having the protruding configuration is provided.

FIG. 15 is a perspective view showing an entire structure of the tongue plate of the modified example of the structure in which the recess portion is formed in the molded portion and the cover is detachably provided.

FIG. 16 is a top view showing the entire structure of the tongue plate of the modified example of the structure in which the recess portion is formed in the molded portion and the cover is detachably provided.

FIG. 17 is side view showing the entire structure of the tongue plate of the modified example of the structure in which the recess portion is formed in the molded portion and the cover is detachably provided.

FIG. 18 is a front view showing the entire structure of the tongue plate of the modified example of the structure in which the recess portion is formed in the molded portion and the cover is detachably provided.

DETAILED DESCRIPTION

It is very important for a vehicle occupant to wear a seatbelt to reduce the chance of accident injury. For example, the occupant seated on the front seat of the automobile is obliged to wear the seatbelt by the Road Traffic Law in Japan. On that ground, a seatbelt apparatus that can be easily handled for is desired. In response to such needs for improving seatbelt wearing operability, various types of modified seatbelt apparatuses have been introduced.

The occupant is expected to wear the seatbelt by gripping the tongue plate to withdraw the webbing from the retractor. The degree of how easily the grip portion is gripped, that is, the grip performance of the tongue plate may give significant influences on the seatbelt wearing operability. The occupant wears the seatbelt by inserting the engagement portion of the tongue plate into the buckle for engagement. The degree of how easily the tongue plate is inserted into a slot portion of the buckle may also give significant influences on the seatbelt wearing operability.

The generally employed seatbelt apparatus as described above has not been structured in consideration for the grip performance of the tongue plate or the insertion easiness of the tongue plate into the buckle.

Accordingly, an object of the present invention is to provide a seatbelt apparatus that improves seatbelt wearing operability.

In order to achieve the aforementioned object, a first embodiment of the invention includes a webbing; a tongue plate attached to the webbing, and provided with a grip portion to be gripped by an occupant and an engagement portion that extends from the grip portion; and a buckle that receives and releases the engagement portion of the tongue plate for engagement and disengagement. A cover is applied to a top surface of one side of the grip portion of the tongue plate.

In the seatbelt apparatus according to the embodiment, the occupant pulls the tongue plate while gripping the grip portion thereof to withdraw the webbing from the retractor, and inserts the engagement portion of the tongue plate into the buckle for engagement so as to wear the seatbelt.

In a second embodiment, a cover is applied to a surface of one side of the grip portion of the tongue plate. For example, the cover is applied to the surface corresponding to the palm of the occupant's hand for gripping the grip portion of the tongue plate. The cover is formed of a non-slip material, for example, a leather material so as to further improve the grip performance of the grip portion of the tongue plate. The occupant is allowed to withdraw the webbing easily upon wearing of the seatbelt so as to improve the seatbelt wearing operability.

In a third embodiment, the tongue plate includes a molded portion that covers the grip portion, and the cover is applied to a top surface of the molded portion on the one side.

In the embodiment, the molded portion is provided to cover the grip portion of the. This can improve the grip performance of the tongue plate. The occupant is allowed to withdraw the webbing easily upon wearing of the seatbelt so as to improve the seatbelt wearing operability.

Generally, the tongue plate is formed of metal as it is required to have high strength. In embodiments of the invention, the molded portion formed of a resin material, for example, is applied to cover the grip portion of the metal tongue plate such that the grip performance of the grip portion may be improved. Further, a cover, a cushion material, or a decorative material may be applied to the provided molded portion so as to further improve both grip performance and the appearance.

In the third embodiment, the cover is detachably applied to the tongue plate or the molded portion.

The occupant is allowed to select the cover (the level of the grip performance) depending on the intended use from the choice including the leather cover with excellent grip performance, the fabric cover with the grip performance at the medium level, and the like. The convenience for the occupant may be improved by the increased freedom degree of the choice. The cover fabricated with various kinds of designs using the display mechanism, like the label or decorative material, may be preliminarily prepared to allow selection of the cover with the desired design so as to be assembled. Accordingly, the tongue plate with various kinds of designs may be provided.

In a fourth embodiment, the cover is applied to the molded portion so as to cover a recess portion formed in the molded portion.

The resultant structure keeps the same thickness as that of the structure having the tongue plate as a thick solid molded product with no recess portion. However, the weight of the tongue plate is lighter because of the hollow portion formed therein. The operability of the tongue plate is improved, and the seatbelt wearing operability may further be improved. The cover applied to cover the recess portion serves to prevent deterioration in the appearance of the tongue plate.

In a fifth embodiment, the tongue plate includes a first grip portion that extends from the grip portion in a longitudinal direction of the webbing.

In the embodiment, the first grip portion is provided that extends in the longitudinal direction of the webbing from the grip portion of the tongue plate. In the case where the occupant tries to grip the tongue plate in darkness, or the occupant is deprived of his/her sight, they are allowed to grip the first grip portion easily as it extends from the grip portion. As a result, the occupant is allowed to withdraw the webbing from the retractor. Even in the situation of difficulties in gripping the tongue plate, the webbing may be withdrawn easily by gripping the first grip, thus improving seatbelt wearing operability.

In a sixth embodiment, at least a portion of the surface of the cover or the first grip portion is formed of a leather material.

In the embodiment, at least the portion of the surface of the cover or the first grip portion is formed of the leather material. That is, the contact portion between the fingers of the occupant's hand and the cover of the first grip portion is formed of the non-slip leather material. This improves the grip performance of each of the grip portion of the tongue plate and the first grip portion.

In a seventh embodiment, a cushion material is applied inside the cover or the first grip portion.

This makes it possible to further improve the grip performance of both the grip portion and the first grip portion of the tongue plate as well as improve the feel thereof.

In an eighth embodiment, the tongue plate includes second grip portions provided at both ends of the grip portion in a lateral direction so as not to protrude from the grip portion.

In the embodiment, the second grip portions are provided at both ends of the grip portion of the tongue plate in the lateral direction. In the case where both ends of the grip portion of the tongue plate in the lateral direction are gripped by the occupant, the grip performance may further be improved. The occupant is allowed to withdraw the webbing easily upon wearing of the seatbelt, thus improving seatbelt wearing operability.

In the embodiment, the second grip portion is provided so as not to protrude from the grip portion. This may improve the grip performance while preventing enlargement of the tongue plate size.

In a ninth embodiment, the second grip portion has a concave-convex surface in contact with fingers of the occupant's hand. This improves the grip performance of the second grip by suppressing the slip between the occupant's fingers and the second grip portion.

In a tenth embodiment, the second grip portion is formed of an elastic material. In the embodiment, the second grip portions provided at both ends of the grip portion of the tongue plate in the lateral direction are formed of an elastic material, such as elastomer. This may further improve the grip performance of the second grip portion by further suppressing the slip between the occupant's fingers and the second grip portion.

In an eleventh embodiment, the second grip portion is molded to be of a color different from that of the cover. Accordingly the visibility of the second grip portion may be improved, and the occupant is allowed to grip the second grip portion easily. This makes it possible to improve the seatbelt wearing operability as well as the design of the tongue plate.

In a twelfth embodiment, the display mechanism is detachably provided to a surface of one side of the grip portion of the tongue plate. In the embodiment, the display mechanism is provided on a surface at one side of the grip portion of the tongue plate. This makes it possible to provide a label on which a name of a tongue plate manufacturer is marked on a front surface of the tongue plate so as to obtain the advertisement effect. As the display mechanism is detachable, the mark that is put thereon may be changed if needed.

In a thirteenth embodiment, a leading end of the engagement portion is rounded. Accordingly, this may reduce the chance that the engagement portion of the tongue plate gets stuck upon its insertion into the slot portion of the buckle, resulting in the smooth insertion. The insertion of the tongue plate upon wearing of the seatbelt may be easily performed, thus improving seatbelt wearing operability.

In a fourteenth embodiment, the buckle includes a slot portion through which the engagement portion of the tongue plate is inserted, and a guiding mechanism provided to surround the slot portion to guide the engagement portion of the tongue plate into the slot portion. In the embodiment, the guiding mechanism is provided to surround the slot portion of the buckle for guiding the engagement portion of the tongue plate into the slot portion. When the occupant inserts the tongue plate into the buckles, the engagement portion of the tongue plate is guided into the slot portion of the buckle by the guiding mechanism, and the occupant is allowed to insert the tongue plate into the buckle easily. As the insertion of the tongue plate upon wearing of the seatbelt is easily performed, the seatbelt wearing operability may be improved.

In a fifteenth embodiment, the guiding mechanism includes slanted surfaces that slant toward the slot portion around all sides thereof. When the occupant tries to insert the tongue plate into the buckle, the engagement portion of the tongue plate is guided into the slot portion of the buckle by the slanted surface formed at the respective sides of the slot portion. This may allow the occupant to easily insert the tongue plate into the buckle.

In a sixteenth embodiment, the guiding mechanism includes at least one of the slanted surfaces that slant toward the slot portion, which is formed of a metal or a metal effect material. The slanted surface of the guiding mechanism, which is formed of the metal or the metal effect material (at the side in contact with the occupant's body) has improved surface strength (hardness) and lubrication (slipperiness) to the tongue plate. This makes it possible to facilitate the insertion of the tongue plate into the buckle. When the occupant inserts the tongue plate into the buckle, the visibility of the guiding mechanism may be improved by the light ray that reflects on the slanted surface formed of the metal or the metal-effect material. The engagement portion of the tongue plate may be smoothly inserted into the slot portion of the buckle, thus improving seatbelt wearing operability.

In a seventeenth embodiment, a decorative material is applied to a surface of a casing of the buckle. In the case where the decorative material formed of, for example, a leather or a synthetic leather material is applied to cover the entire surface or a front surface (opposite to the side in tight contact with the occupant) of the casing for the buckle, when the occupant grips the casing of the buckle for wearing the seatbelt, the occupant reaches the decorative material formed of the leather or the synthetic leather with the palm such that the grip performance of the buckle may be improved. In the thus described way, the decorative material of the leather or the synthetic leather is applied to cover the entire surface or the front surface of the casing, for example, so as to improve the decorative performance of the buckle. The decorative material may be integrally molded with the casing through the insert molding, or adhered to the casing. Especially the integral molding through the insert molding makes it possible to effectively improve both the productivity and the appearance.

As described above, embodiments of the present invention may be capable of improving seatbelt wearing operability.

Embodiment of the present invention will now be described with reference to the drawings, which are exemplary only.

FIG. 1 is a perspective view of a portion around a seat, which represents an outline structure of a seatbelt apparatus according to the embodiment.

Referring to FIG. 1, a seatbelt apparatus 100 includes a retractor 2 fixed to a lower portion of a center pillar 1 at the side of the vehicle interior, a webbing 3 that is withdrawn from the retractor 2, a through ring 4 attached to the upper portion of the center pillar 1, a tongue plate 5 moveably attached to the webbing 3, a buckle 6 that receives and releases the insertion of the tongue plate 5 for engagement and disengagement, and a pretensioner 7 that suppresses the reduction in the tension applied to the webbing 3 by pulling the buckle 6 in emergency situations.

The webbing 3 withdrawn from the retractor 2 upward of the vehicle body passes through the through ring 4, and then extends downward of the vehicle body. The webbing 3 has an end portion 3a fixed to the inner wall of the vehicle body between the center pillar 1 and the seat 8.

The tongue plate 5 is provided between the through ring 4 of the webbing 3 and the end portion 3a movably along the webbing 3. The occupant is restrained on the seat 8 through the engagement of the tongue plate 5 with the buckle 6 that protrudes upward from the seat 8 at the inner side of the vehicle body.

FIG. 2 is a perspective view of an outline structure of the tongue plate 5, FIG. 3 is a top view thereof, FIG. 4 is a bottom view thereof, FIG. 5 is a side view thereof, and FIG. 6 is a sectional side view taken along line VI-VI of FIG. 3.

Referring to FIGS. 2 to 6, the tongue plate 5 includes a grip portion 5A to be gripped by the occupant, and an engagement portion 5B that extends from the grip portion 5A so as to be engaged with the buckle 6.

The engagement portion 5B is formed of a metallic tongue plate core material 9 that extends from the grip portion 5A. The tongue plate core material 9 has an engagement hole 9a formed therein, which is fit with an engagement member (not shown) of the buckle 6 upon the insertion such that the tongue plate 5 is engaged with the buckle 6.

Both corner portions 9b1, 9b1 of a leading end 9b of the tongue plate core material 9 (engagement portion 5B) are chamfered such that the portion between the corners 9b1 and 9b1 is formed into a circular arc expanding outwardly. The leading end 9b of the tongue plate core material 9 (engagement portion 5B) has a round shape so as to be smoothly inserted into a slot portion 15 (to be described later) of the buckle 6.

The grip portion 5A includes the tongue plate core material 9 (grip portion), a molded portion 10 formed of the resin material to cover the tongue plate core material 9 (grip portion), a cover 11 applied to one surface of the molded portion 10 (upper side in FIG. 2, front side in FIG. 3, and left sides in FIGS. 5 and 6, hereinafter referred to as the "front surface" side), a label 12 (display mechanism) provided on a position around the center of the tongue plate grip portion 5A, and grip portions 13, 13 (second grip portions) provided at both ends of the molded portion 10 in the lateral direction (both left and right ends in FIGS. 3 and 4), and configured not to protrude from the grip portion 5A.

The label 12, the cover 11, and the molded portion 10 are integrally molded. The integral molding may be performed through one of the following processes including: the integral molding of the label 12, the cover 11, and the molded portion 10 each having the same color; two-color molding by performing the insert molding of the label 12 as the insert material and the cover 11, which is further combined with the molded portion 10; and the insert molding of the label 12 as the insert material and the cover 11 performed simultaneously with the two-color molding of the insert molded product and the molded portion 10. The integral molding of the label 12, the cover 11 and the molded portion 10 makes it possible to improve both productivity and appearance.

The molded portion 10 has insertion holes 10a and 10b in the side opposite to the engagement portion 5B (upper side in FIGS. 3 to 6), and in the other side (lower side in FIG. 2, front side in FIG. 4, and right side in FIGS. 5 and 6, hereinafter referred to as the "back surface" side), through which the webbing 3 is inserted. When the webbing is slidably inserted into the insertion holes 10a and 10b, the tongue plate 5 is allowed to be moved with respect to the webbing 3.

Preferably, the cover 11 is covered with the decorative material, for example, genuine leather, synthetic leather, wood, fabric and the like. More preferably, it is covered with the non-slip material, for example, the genuine leather or the synthetic leather. The cover 11 is integrally molded only with the front surface of the molded portion 10 through insert molding, or adhered to the molded portion 10. In the case where the cover 11 is integrally molded through the insert molding, both productivity and outer appearance may be effectively improved. This makes it possible to allow the cover 11 to be at the position corresponding to the palm of the occupant's hand when the occupant grips the grip portion 5A of the tongue plate 5 for wearing the seatbelt. The grip performance of the tongue plate 5, thus, may be improved.

The label 12 is used for displaying, for example, a name of a manufacturer of the tongue plate 5, which is fixed on the position around the center of the grip portion 5A of the tongue plate 5 using adhesive or the like. The cover 11 is not applied to the position of the label 12 that is adhered to the molded portion 10 (see FIG. 6). In the structure, the label 12 can be peeled off so as to be replaced without influencing the cover 11.

The grip portions 13 are provided at both ends 3a of the molded portion 10 in the lateral direction so as not to protrude from the grip portion 5A (in other words, so as to be within an outline of the molded portion 10). The grip portion 13 is formed of the elastic material (elastomer in the present embodiment), and has a concave-convex surface in contact with the occupant's fingers.

In the case where the occupant grips the ends 3a of the tongue plate grip portion 5A upon wearing of the seat belt, the slip of the occupant's fingers with respect to the grip portions 13 may be suppressed, thus improving the grip performance of the tongue plate 5. The grip portion 13 is molded to be of the bright color (for example, orange, yellow, and the like) that is different from the color of the cover 11. This makes it sure for the occupant to easily have a visual identification of the position of the grip portions 13.

FIG. 7 is a perspective view of an outline structure of the buckle 6, FIG. 8 is a front view of the buckle seen from the slot portion, and FIG. 9 is a side view thereof.

Referring to FIGS. 7 to 9, the buckle 6 includes a casing 14, a slot portion 15 formed at the front of the casing 14 (front side in FIG. 8, and left side in FIG. 9), through which the engagement portion 5B of the tongue plate 5 is inserted, a release button 16 retractably provided at the front of the casing 14 for releasing the engagement between the buckle 6 and the tongue plate engagement portion 5B, and a protruding portion 17 that protrudes forward at a position opposite to the release button 16 with respect to the slot portion 15, which is provided with a slanted surface 17a that slants toward the slot portion 15. Referring to FIG. 9, the protruding portion 17 protrudes outward farther than the release button 16 such that the slanted surface 17a is easily aligned with the tongue plate engagement portion 5B.

Preferably, the casing 14 has its entire surface or the front surface (opposite to the side in tight contact with the occupant) covered with the decorative material formed of, for example, the genuine leather or the synthetic leather. The decorative material is integrally molded with the casing 14 through insert molding, or adhered to the casing 14. In the case where the casing 14 is integrally molded through the insert molding, the productivity and the appearance may be effectively improved. The decorative material formed of the genuine leather or the synthetic leather is expected to be at the position corresponding to the palm of the occupant who grips the casing 14 of the buckle 6 for wearing the seatbelt. The grip performance of the buckle 6, thus, may be improved.

A slanted surface 16a toward the slot portion 15 is formed at the front of the release button 16 at the side of the slot portion 15. Slanted surfaces 18 and 19 toward the slot portion 15 are also formed at left and right sides of the slot portion 15 (left and right sides in FIGS. 7 and 8), respectively. The buckle 6 has the slanted surfaces 16a, 17a, 18 and 19 which surround the respective sides of the slot portion 15 such that the tongue plate engagement portion 5B is guided by those slanted surfaces 16a, 17a, 18 and 19, and inserted into the slot portion 15 of the buckle by the occupant. Preferably, the slanted surface 17a is formed of the metal or the metal-effect decorative material. The slanted surface 17a is at the side in contact with the body of the occupant who intends to wear the seatbelt apparatus 100. The occupant can see the slanted surface 17a when the occupant wears the seatbelt. Further, the slanted surface 17a serves as the guiding function to guide insertion of the engagement portion 5B of the tongue plate 5 that abuts thereagainst and slides thereon. If the slanted surface 17a is formed of the metal or the metal-effect decorative material, the resultant surface strength (hardness) and lubrication (slipperiness) with respect to the tongue plate 5 may be improved, and the insertion of the tongue plate into the buckle may be facilitated. The visibility of the slot portion 15 may be improved by the light that reflects on the slanted surface formed of the metal or the metal-effect material so as to allow the occupant to insert the engagement portion 5B into the buckle 6. As the tongue plate engagement portion 5B may be inserted into the slot portion 15 of the buckle 6 smoothly, the seatbelt wearing performance may be improved.

The slanted surfaces 16a, 17a, 18, and 19 constitute the guiding mechanism in an embodiment of the invention for guiding the engagement portion of the tongue plate into the slot portion.

The seatbelt apparatus 100 according to the embodiment as has been described may provide the following advantages.

In the seatbelt apparatus 100, in response to the occupant's operation to pull the tongue plate 5 while gripping the grip portion 5A of the tongue plate 5, the webbing 3 is withdrawn from the retractor 2. Then the engagement portion 5B of the tongue plate 5 is inserted into the slot portion 15 of the buckle 6 so as to be engaged for wearing of the seatbelt.

In the present embodiment, the cover 11 formed of the non-slip material such as leather is applied to the front surface of the molded portion 10 of the tongue plate grip portion 5A. When the occupant grips the tongue plate grip portion 5A, the cover 11 is expected to be in contact with the palm of the occupant's hand, thus improving the grip performance of the grip portion 5A of the tongue plate 5. This allows the occupant to withdraw the webbing 3 easily upon wearing of the seatbelt, resulting in improved seatbelt wearing operability.

In the embodiment, as the cover 11 is applied only to the front surface of the tongue plate 5, the following advantage may also be obtained. That is, the cover 11 applied only to the front surface of the tongue plate 5 allows the occupant to distinguish between the front surface and back surface of the tongue plate 5 by touching. In the case where the occupant tries to wear the seatbelt in darkness, or the occupant who is deprived of his/her sight tries to wear the seatbelt, such structure allows the occupant to wear the seatbelt correctly without mixing up the front surface and the back surface. The present embodiment, thus, provides the advantage to reduce the chance of improper wearing of the seatbelt by mistake.

In the present embodiment, as the leather cover 11 is applied to the front surface of the tongue plate 5, the appearance of the tongue plate 5 may be improved.

In the present embodiment, the grip portions 13, 13 each having the concave-convex surface are formed on both sides 3a of the tongue plate grip portion 5A in the lateral direction. In the case where the occupant grips the tongue plate grip portion 5A at both sides for wearing the seatbelt, the slip between fingers of the occupant's hand and the grip portions 13 is suppressed to considerably improve the grip performance of the tongue plate 5. This allows easy withdrawal of the webbing 3 so as to improve the seatbelt wearing operability. In the present embodiment, as the grip portions 13 are provided so as not to protrude from the tongue plate grip portion 5A, the tongue plate 5 is kept from being enlarged, thus improving its grip performance.

In the present embodiment, the elastomer is employed as the material for forming the grip portion 13. The resultant structure improves the durability and recycling efficiency compared with the use of the rubber material for forming the grip portion 13, yet maintaining the equivalent flexibility.

In the present embodiment, unlike the color of the cover 11, the grip portion 13 is molded to be of the bright color such that the visibility of the grip portion 13 is improved. This allows the occupant to grip the grip portions 13 easily, thus improving seatbelt wearing operability.

In the present embodiment, the label 12 is applied on the position around the center of the front surface of the grip portion 5A of the tongue plate 5. This allows the name of the manufacturer of the tongue plate 5 to be marked, thus improving the advertisement efficiency. The design of the tongue plate 5 may be improved by using ingenuity with respect to the mark put on the label 12 (character style and color). In the present embodiment, the label 12 may be provided so as to be replaceable. For example, the mark may be changed in response to the change of the manufacturer's name when needed. The design may further be improved by using ingenuity with respect to the character style, color and the like of the mark conforming to the latest trend.

In the present embodiment, the leading end of the tongue plate grip portion 5B is rounded. This may realize smooth insertion of the tongue plate engagement portion 5B performed by the occupant by preventing the engagement portion 5B from being stuck. As the insertion of the tongue plate may be easily performed when wearing the seatbelt, the seatbelt wearing operability may be improved.

In the present embodiment, the slanted surfaces 16a, 17a, 18 and 19 toward the slot portion 15 of the buckle 6 are formed to surround the respective sides of the slot portion 15. In response to the occupant's operation to wear the seatbelt, the tongue plate engagement portion 5B is guided by the slanted surfaces 16a, 17a, 18 and 19 into the slot portion 15. The occupant, thus, is allowed to insert the tongue plate 5 into the buckle 6 easily upon wearing of the seatbelt, thus improving seatbelt wearing operability.

The present invention is not limited to the embodiment as described above. Various other exemplary embodiments are described below.

According to an alternative embodiment a tongue plate 50 may include cushion material 20 applied to the inside of the cover 11. FIG. 10 is a sectional side view of the tongue plate 50. Referring to FIG. 10, a grip portion 50A of the tongue plate 50 according to the modified example includes the molded portion 10, the cover 11 applied to the front surface of the molded portion 10, and a cushion material 20 interposed between the molded portion 10 and the cover 11. The tongue plate 50 also includes an engagement portion 50B. In the present embodiment as described above, the cover 11 is directly applied to the front surface of the molded portion 10 of the tongue plate grip portion 5A (see FIG. 6). Otherwise, the cushion material such as the urethane may be interposed between the molded portion 10 and the cover 11 as shown in FIG. 10. The cover 11 is preferably leather-covered.

In the exemplary embodiment described above, the grip performance of the grip portion 50A of the tongue plate 50 may further be improved as well as the degree of the touch feel. This makes it possible to reduce chances of the injury caused by bumping of the occupant's fingers or body against the tongue plate grip portion 50A, or the damage of the tongue plate itself and parts of the vehicle body caused by the clash of the tongue plate grip portion 50A against the vehicle parts such as the center pillar 1. The effect for reducing the noise resulting from the aforementioned bumping or clash may be obtained.

FIG. 11 is a sectional side elevation of a tongue plate 105 with a grip portion 105A and an engagement portion 105B according to another exemplary embodiment. Referring to FIG. 11, the grip portion 105A of the tongue plate 105 of the modified example has a molded portion 10. The molded portion 10 is provided with a label 12. The cover 11 is directly applied to the front surface of the molded portion 10 of the tongue plate grip portion 5A as shown in FIG. 6. In the case of the tongue plate 50 shown in FIG. 10, the cushion material 20, for example, urethane material is interposed between the molded portion 10 and the cover 11. In the example, the molded portion 10 is applied to the front surface of the grip portion 105A without provided with the cover as shown in FIG. 11.

The label 12 and the molded portion 10 are integrally molded. In this case, the integral molding may be performed through one of the following processes including: the integral molding of the label 12 and the molded portion 10 each having the same color (including insert molding); the insert molding of the label 12 as the insert material and the molded portion 10; and two-color molding of the label 12 and the molded portion 10. The integral molding of the label 12 and the molded portion 10 makes it possible to improve both productivity and appearance.

In the exemplary embodiment, as the grip portion 105A of the tongue plate 105 is provided with the molded portion 10, the grip performance may be improved compared with the structure with no molded portion, and the degree of the touch feel may also be improved. The molded portion 10 applied to the grip portion 105A of the tongue plate 105 may prevent various risks of injuries caused by bumping of the occupant's fingers or body against the tongue plate grip portion 105A, or the damage of the tongue plate 105 itself and parts of the vehicle body caused by the clash of the tongue plate grip portion 105A against the vehicle parts such as the center pillar. The effect for reducing the noise resulting from the aforementioned bumping or clash may be obtained.

According to another alternative embodiment the tongue plate may be provided with protruding grip. In the aforementioned embodiment, the grip portions 13 are provided to the tongue plate grip portion 5A at both sides 3a in the lateral direction so as not to protrude therefrom. Otherwise, the grip that protrudes from the grip portion 5A may be provided. FIG. 12 is a perspective view of an outline structure of a tongue plate 305 of a modified example, FIG. 13 is a top view thereof, and FIG. 14 is a side view thereof.

Referring to FIGS. 12 to 14, the tongue plate 305 includes a grip portion 305A to be gripped by the occupant, an engagement portion 305B that extends from the grip portion 305A to be engaged with the buckle 6, and a grip (first grip portion) 21 that extends substantially along the longitudinal direction of the webbing 3 while curving toward the front surface of the grip portion 305A.

The engagement portion 305B is formed of a metallic tongue plate core material 309, which extends from the grip portion 305A. Both corner portions 309b1, 309b1 of a leading end 309b of the tongue plate core material 309 (engagement portion) are chamfered as in the aforementioned embodiment so as to be smoothly inserted into the slot portion 15 of the buckle 6.

The grip portion 305A includes the tongue plate core material 309 (grip portion), a molded portion 310 formed of the resin material which is provided to cover the tongue plate core material 309 (grip portion), and a cover 311 applied to the front surface of the molded portion 310 (upper side in FIG. 12, front side in FIG. 13, and upper side in FIG. 14). Insertion holes 310a and 310b that allow the webbing 3 to pass therethrough are formed in the tongue plate core material 309 (grip portion) and the molded portion 310, respectively. As the webbing 3 is inserted into those insertion holes 310a and 310b, and slidably moves, the tongue plate 305 is moveable with respect to the webbing 3. The cover 311 is formed of the leather material as in the aforementioned embodiment, which is applied only to the front surface of the molded portion 310 by the adhesive or the like.

The grip 21 is provided integrally with the tongue plate grip portion 305A, which extends from the grip portion 305A to the opposite side of the engagement portion 305B substantially along the longitudinal direction of the webbing 3 while curving to the front surface of the grip portion 305A. The leather is covered to the surface of the grip 21 to improve its grip performance. The cushion material 20 such as the urethane material is applied inside the grip 21 so as to provide effects for improving the degree of the touch feel, and reducing chances of the injury, damage, and the noise resulting from the bumping or clash.

In the embodiment described above, the cover 311 is applied to the front surface of the tongue plate 305. This improves the grip performance of the tongue plate 305 as in the aforementioned embodiment as well as the seatbelt wearing operability. The protruding grip 21 may provide the advantage as described below.

In the case where there are difficulties for the occupant to grip the grip portion 305A of the tongue plate 305 for some reason, for example, the occupant tries to grip the tongue plate 305 in darkness, or the occupant is deprived of his/her sight, the grip portion 305A may be easily gripped because of the grip 21 protruding from the grip portion 305A. The occupant grips the grip 21 to pull the tongue plate 305 such that the webbing 3 is withdrawn from the retractor 2. From the reason as described above, the grip 21 can be gripped to withdraw the webbing 3 easily irrespective of the case where the occupant finds difficulties in gripping the tongue plate 305. This improves seatbelt wearing operability.

The grip 21 protrudes along the longitudinal direction of the webbing 3. This may reduce the protruding amount compared with the case where the grip is provided to protrude in the lateral direction of the tongue plate 305 (in the direction perpendicular to the longitudinal direction of the webbing 3). Accordingly, the size of the tongue plate may be reduced, and the storing capability may also be enhanced. As the grip 21 has a shape that curves toward the front, the occupant is free from the uncomfortable feel upon wearing of the seatbelt. The grip 21 is formed of the leather material and has the cushion material 20 applied to the inner surface thereof. This makes it possible to realize the weight reduction compared with the case where the grip 21 is formed of the synthetic resin material, for example. As the grip 21 is integrally formed with the tongue plate 305, the chance of missing the grip 21 or skipping the assembly may be reduced compared with the case where the grip 21 is provided independently from the tongue plate 5.

It is to be clearly understood that the cushion material 20 may be applied inside the cover 311 as described above.

According to another exemplary embodiment a recess portion may be formed in the molded portion, and the cover may be detachably provided. FIG. 15 is an exploded perspective view of a tongue plate 205. FIG. 16 is a top view thereof, FIG. 17 is a side view thereof, and FIG. 18 is a bottom view thereof, respectively.

In the exemplary embodiment shown in FIGS. 15 to 18, the tongue plate 205 includes a molded portion 210 having a recess portion 210b and a cover 211. The recess portion 210b is surrounded by a peripheral portion 210a at the side corresponding to the palm. The cover 211 is provided with a plurality of engagement pieces 23 (in this case, two points) each having a substantially pawl-like shape corresponding to each of a plurality of engagement holes 22 (in this case, two points) formed on the inner surface of the peripheral portion 210a so as to be engaged therewith or disengaged therefrom. The cover 211 is structured to be detachable with respect to the molded portion 210.

The cover 211 is applied to the molded portion 210 so as to cover the recess portion 210b. The cover 211 is provided with the label 12 through the insert molding. When the cover 211 is detached from the molded portion 210, the label 12 is also detached together with the cover 211.

In the present embodiment, the structure of the molded portion and the cover 211 keeps the same thickness as that of the structure of the molded portion formed as the thick solid molded product with no cover (see molded portion shown in FIGS. 6, 10, and 11). However, the hollow portion (recess portion 210b) functions to reduce the weight of the structure, and the cover 211 with various kinds of design displayed on the label 12 may be prepared. The cover with the desired design may be assembled so as to prepare the tongue plate 205 with the various kinds of design.

According to another exemplary embodiment, the grip portion may be modified. In the embodiment, the grip portions 13, 13 at both ends 3a of the tongue plate grip portion 5A in the lateral direction are molded to be of the same color (for example, orange). Otherwise, the grip portions 13, 13 may be molded of colors different from each other. This may improve visibility of the grip portions 13. Furthermore, the occupant is able to immediately recognize the position (front surface or back surface) of the tongue plate 5 based on the color of the grip portion 13 so as to prevent improper wearing of the seatbelt by mistake. The design may also be enhanced by the use of various colors. If the grip portions 13 are molded of the fluorescent color, they may be easily identified even in darkness. In the aforementioned embodiment, each of the grip portions 13, 13 has the same configuration so as to be applied to both ends 3a of the tongue plate grip portion 5A in the lateral direction. If they have different surface configurations, for example, having different numbers of the concave and convex portions formed on surfaces thereof and applied to both ends of the grip portion 13, the occupant is able to identify the position of the tongue plate 5 by touching, thus reducing the chance of improper wearing of the seatbelt by mistake.

According to yet another exemplary embodiment a label (display mechanism) may be provided. In the aforementioned embodiment, the manufacturer's name is put on the label 12. Otherwise, the name of the occupant to be seated on the seat, or the message that calls attention to the occupant to wear the seat belt, or any other suitable message may be marked on the label 12. The design of the tongue plate may be improved by marking colors and the design patterns in addition to the characters. In the embodiment, the label is adhered to the molded portion. Otherwise, it may be fixed through fitting, tightening with the screw and the like.

The embodiments described above have been introduced as examples for applying the invention to the automobile. Otherwise, embodiments of the invention may be applied to the seatbelt apparatus equipped in other types of vehicles, such as, for example, trains, airplanes and the like.

Priority Applications JP2005-238477, filed Aug. 19, 2005 and JP2006-167135, filed Jun. 16, 2006, including the specifications, drawings, claims and abstracts, are incorporated herein by reference in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seatbelt apparatus comprising:
    a webbing;
    a tongue plate attached to the webbing and provided with a grip portion to be gripped by an occupant and an engagement portion that extends from the grip portion; and
    a buckle that receives and releases the engagement portion of the tongue plate for engagement and disengagement,
    wherein a cover is connected to a top surface of only one side of the grip portion of the tongue plate,
    wherein the tongue plate includes a molded portion that covers the grip portion, and the cover is connected to a top surface of the molded portion on the one side.

2. The seatbelt apparatus according to claim 1, wherein the cover is detachably connected to the tongue plate or the molded portion.

3. The seatbelt apparatus according to claim 2, wherein the cover is connected to the molded portion so as to cover a recess portion formed in the molded portion.

4. The seatbelt apparatus according to claim 1, wherein the tongue plate includes a first grip portion that extends from the grip portion in a longitudinal direction of the webbing.

5. The seatbelt apparatus according to claim 1, wherein at least a portion of the surface of the cover or the first grip portion comprises a leather material.

6. The seatbelt apparatus according to claim 5, further comprising a cushion material attached to an inside surface of the cover or the first grip portion.

7. The seatbelt apparatus according to claim 4, wherein the tongue plate includes second grip portions provided at both ends of the grip portion in a lateral direction so as not to protrude from the grip portion.

8. The seatbelt apparatus according to claim 7, wherein the second grip portion has a concave-convex surface in contact with fingers of an occupant's hand.

9. The seatbelt apparatus according to claim 8, wherein the second grip portion comprises an elastic material.

10. The seatbelt apparatus according to claim 9, wherein the second grip portion is molded to be a color different from that of the cover.

11. The seatbelt apparatus according to claim 1, further comprising a display mechanism detachably connected to a surface of one side of the grip portion of the tongue plate.

12. The seatbelt apparatus according to claim 1, wherein a leading end of the engagement portion is rounded.

13. The seatbelt apparatus according to claim 1, wherein the buckle includes a slot portion through which the engagement portion of the tongue plate is inserted, and a guiding mechanism provided to surround the slot portion to guide the engagement portion of the tongue plate into the slot portion.

14. The seatbelt apparatus according to claim 13, wherein the guiding mechanism includes slanted surfaces that slant toward the slot portion around all sides of the slot portion.

15. The seatbelt apparatus according to claim 14, wherein the guiding mechanism includes at least one slanted surface that slants toward the slot portion and that comprises a metal or a metal-effect material.

16. The seatbelt apparatus according to claim 14, wherein one of the slanted surfaces is located on a protruding portion opposite a release button on the buckle, wherein the one slanted surface is visible to an occupant when the tongue plate is engaged with the buckle.

17. The seatbelt apparatus according to claim 1, further comprising a decorative material connected to a surface of a casing of the buckle.

* * * * *